United States Patent Office 2,890,125
Patented June 9, 1959

2,890,125

MODIFICATION OF OXIDIZED HYDROCARBONS AND PRODUCTS THEREFROM

Franklin E. Mange, University City, Mo., assignor to Petrolite Corporation, Wilmington, Del., a corporation of Delaware No Drawing. Application October 1, 1956
Serial No. 612,946

56 Claims. (Cl. 106—23)

The present invention has two main aspects. This invention relates to modifications of oxidized hydrocarbon waxes by means of an organic compound and resultants or cogeneric mixtures obtained from oxidized hydrocarbon waxes and an organic compound containing, as the sole reacting groups, a plurality of separate and distinct groups having the formula —X=C=Y, wherein X is a member of the class consisting of —C and N, and Y is a member of the class consisting of O, S, and NR where R is a member of the class consisting of hydrogen and monovalent hydrocarbon radicals. The preferred class of the above reactants are the isocyanates and more specifically the polyisocyanates with particular reference to the diisocyanates. See U.S. Patent No. 2,430,479, dated November 11, 1947, to Burt Carlton Pratt et al.

This invention has as a main object a method or process for making waxes having many of the properties of the hard, more expensive natural waxes, as exemplified by carnauba wax, ouricury wax, candelilla wax, etc. from cheap and readily available materials. In the past, no synthetic wax and, particularly, one derived from microcrystalline wax, Fischer-Tropsch wax, etc. has exhibited a combination of all the desirable properties which characterize the hard natural waxes.

This invention has as another main object the utilization of such resultants for use in carbon paper inks and, more specifically, for use in one-time carbon paper inks.

A concise statement as to certain problems involved in the compounding of carbon transfer inks is made in U.S. Patent No. 2,426,248, dated August 26, 1947, to Sugarman. For purpose of brevity the second paragraph as it appears in the specifications of said patent is quoted verbatim herewith:

"In compounding carbon transfer inks, wherein waxes and oils are incorporated with pigment or dye stuffs, such as carbon black, it has been recognized that presence of certain waxes are necessary to impart a degree of dispersion and fluidity to the mixture. These were generally carnauba, ouricury, and reed waxes. However, certain vegetable waxes of considerable commercial importance, of which candelilla wax is one example, were found to lack sufficient dispersive powers possessed by the other waxes previously mentioned. It was also known that mineral waxes, such as paraffin, ozokerite and analogous waxes, possessed little or no dispersive powers whatever."

Said aforementioned U.S. Patent No. 2,426,248 proceeds to describe in detail the manufacture of carbon transfer inks, the step of intermixing an oxidized vegetable wax, which contains fatty acids of chain lengths of from 20 to 30 carbon atoms, into carbon black, in a low viscosity petroleum oil, producing an increase in the dispersion of the carbon black therein and an increase in the fluidity of the product, affording a fluid dispersion.

The products of reactions so obtained by the present process have many other uses. They may serve as substitutes or replacements for a number of waxes now available such as oxidized wax, carnauba wax, ouricury wax, sugar cane wax, etc., or for blending with, or otherwise modifying the character of, other available waxes. The products of this invention are also particularly useful in the making of various polishes, such as emulsion, paste, or cream floor polishes, automobile polishes, furniture polishes, etc. They may also be used as an additive to lubricants, as an additive to rust inhibiting compounds, etc. In these instances the compounds function for some reason other than their wax-like character.

A variety of hydrocarbon waxes and comparable materials principally hydrocarbon in nature have been subjected to oxidation in various manners and particularly by the use of an oxygen-containing gas in the presence of an oxidation catalyst such as a wax soluble organic salt, such as manganese or cobalt naphthenate or stearate. The preparation of these oxidized hydrocarbon materials is well known and has been described extensively in the literature, particularly in the patent literature.

The reaction involving diisocyanates or other reactants of the kind hereinafter described with oxidized hydrocarbon materials or oxidized wax mixtures in a general way is conducted in the same manner that diisocyanates have been reacted with other suitable reactants including reactants in which the chemical compounds have one or more functional groups. (See, for example, Chemical Reviews, 43, 203–218 (1948).)

In summary then, the present invention in its broadest aspect includes the new products or compositions so obtained; the method of preparing the same; the utilization of such resultants in carbon paper inks and the application in a wide number of arts, including the art where wax or waxes are employed.

For purpose of convenience what is said hereinafter will be divided into five parts.

Part 1 is concerned with suitable organic compounds which contain, as the sole reacting groups, a plurality of separate and distinct groups having the formula —X=C=Y, wherein X is a member of the class consisting of —C and N, and Y is a member of the class consisting of O, S, and NR where R is a member of the class consisting of hydrogen and monovalent hydrocarbon radicals. For convenience, Part 1 is subdivided into two sections. Section A is concerned with a broad class of reactants and Section B is concerned with the preferred diisocyanates.

Part 2 is concerned with suitable oxidized hydrocarbon waxes or mixtures. This part is to be divided into two sections. The first section is concerned with the various types of hydrocarbon waxes or mixtures which can be used and the second section describes the oxidation process which is used.

Part 3 is concerned with the method, or process, which reacts the two classes of materials above noted so as to produce the desired end product or resultant. As will be pointed out subsequently, the addition of a mere trace of water (approximately .05 to .5%) materially affects and, in many instances, radically changes the nature of the result. One cannot be certain whether the water acts as a catalyst or reactant, or both.

Part 4 is concerned with uses for the products in carbon paper inks derived in the manner described in Part 3 preceding.

Part 5 is concerned with other uses or industrial application of such products of reaction or cogeneric mixtures or either as such or in combination with other well known waxes. These uses include, for example, the manufacture of various polishes with particular reference to furniture polish or floor polish and the like.

PART 1

Section A

Broadly speaking, the materials which can be reacted with oxidized wax for the purpose of this invention are the organic compounds, containing, as the sole reacting group, a plurality of separate and distinct groups having the formula —X=C=Y, wherein X is —C or N and Y is O, S, or NR wherein R is hydrogen or a monovalent hydrocarbon radical. See above-mentioned U.S. Patent No. 2,430,479, dated November 11, 1947, to Burt Carlton Pratt et al.

A preferred subgenus of this invention is that wherein the active hydrogen containing oxidized hydrocarbon wax is reacted with a compound having a plurality of —N=C=Z groups, wherein Z is a chalcogen (J. Am. Chem. Soc., 63, 892 (1941)) of atomic weight less than 33. This subgenus includes the polyisocyanates, the polyisothiocyanates and mixed isocyanate-isothiocyanates having at least one of each of these groups. For convenience of disclosure, the invention will be discussed below largely in terms of the polyisocyanates.

The preferred diisocyanates, diisothiocyanates and mixed isocyanate-isothiocyanates having the general formula ZCN—R—NCZ in which R is a divalent hydrocarbon radical and Z is a chalcogen of atomic weight less than 33.

Examples of other types of —X=C=Y compounds which may be used include carbon suboxide $C_3O_2$, carbon subsulfide $C_3S_2$, diethylenediketene $$\left( O=C=C\begin{array}{c}CH_2-CH_2\\ \diagup \quad \diagdown \\ \diagdown \quad \diagup \\ CH_2-CH_2\end{array}C=C=O \right)$$

and compounds of formulae:

$$O=C=C-(CH_2)_6-C=C=O$$
$$\quad\quad |\quad\quad\quad\quad\quad |$$
$$\quad\quad CH_3\quad\quad\quad\quad CH_3$$

$$C_6H_5N=C=N-(CH_2)_6-N=C=NC_6H_5$$

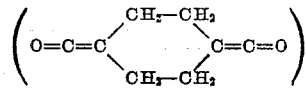

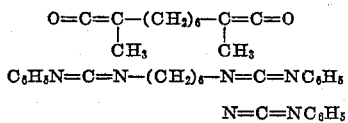

and

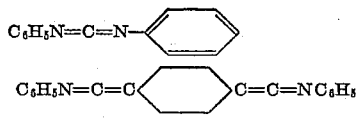

Of the organic compounds described by the above formulae, the most useful, because of their greater availability, reactivity, ease of manufacture, and cost, are the isocyanates or the thioisocyanates, or combinations of these two.

Section B

A preferred subgenus of this invention is that wherein the above partial structural formula represents the polyisocyanate and more specifically the diisocyanates, which of course contain two distinct and separate isocyanate groups. Representative compounds of this subgenus are the polymethylene diisocyanates such as ethylene diisocyanate, trimethylene diisocyanate, tetramethylene diisocyanate, pentamethylene diisocyanate, etc.; the alkylene diisocyanates such as propylene-1,2-diisocyanate, butylene-1,2-diisocyanate, butylene-1,3-diisocyanate, butylene-2,3-diisocyanate, the alkylidine diisocyanates such as ethylidene diisocyanate, butylidene diisocyanate, and heptylidene diisocyanate. The cycloalkylene diisocyanates such as cyclopentylene-1,3-diisocyanate, cyclohexylene-1,2-diisocyanate, cyclohexylene-1,4-diisocyanate, the aromatic diisocyanates such as m-phenylene diisocyanate, p-phenylene diisocyanate, 1-methylphenylene-2,4-diisocyanate, 1-methylphenylene-2,6-diisocyanate, 3,3'-bitoylene-4,4'-diisocyanate, naphthylene-1,4-diisocyanate, naphthylene-1,5-diisocyanate, aliphatic-aromatic diisocyanate such as xylylene-1,4-diisocyanate, xylylene-1,3-diisocyanate, 4,4'-diphenylenemethane diisocyanate, 4,4'-diphenylenepropane diisocyanate, etc.

The diisocyanates of the types listed in the above paragraph are the ones which are most preferred for purposes of this invention. Examples of compounds containing more than two reactive groups of formula —X=C=Y and of the preferred subgenus —N=C=O which can be used, there may be mentioned 1,2,4-benzene triisocyanate and butane,1,2,2-triisocyanate.

Of course, it should be remembered that the polyisothiocyanates may be used instead of the polyisocyanates and representative examples would be those given above with the single change that the oxygen atom is substituted by sulfur.

PART 2

Section A

Oxidized hydrocarbon waxes which can be used for the purposes of this invention are varied and a partial list of such hydrocarbons which can be oxidized include such waxes as plastic microcrystalline wax, tank bottom derived micro-crystalline wax, paraffin wax, scale wax, Fischer-Tropsch wax, ozokerite, Utah wax, various types of polyethylene, polypropylenes, etc.

The preferred types of hydrocarbon wax are the hard waxes having a melting point between 170° C. to 220° F. Waxes which can be found within this range and with the desired hardness are microcrystalline wax, Fischer-Tropsch wax, and some of the polyethylenes.

One of the more desirable starting materials for the manufacture of an oxidized hydrocarbon wax is tank bottom derived microcrystalline wax. The collecting of tank bottom waxes is conducted principally in the middle western oil fields such as in Kansas, Oklahoma, Louisiana and Texas, as well as elsewhere to a lesser degree. The production of microcrystalline wax from tank bottoms is well known and has been described in the literature. (See, for example, U.S. Patent No. 2,443,840, dated June 22, 1948, to Stossel.) These waxes are currently being produced by at least two companies and have a melting point ranging from about 170° to 200° F. They contain essentially long chained normal and branched paraffins containing from 30 to 100 carbon atoms per molecule with perhaps some naphthenic type compounds. They range in color from white to a dark brown, but it is preferable to oxidize a wax having a pale yellow color for economical reasons and for ease of oxidation.

Another desirable starting material is the plastic microcrystalline wax of higher melting point which is derived from various lube oil stocks and petrolatums. This type of wax has been well described in the article on "Microcrystalline Waxes, Their Manufacture, Properties and Uses in the Paper Industry," by Bruce H. Clary in The Industry and Paper World of February 1956. These waxes are more plastic than the tank bottom derived microcrystalline waxes and are composed probably to a large extent of naphthenic type hydrocarbons of high molecular weight. These waxes are manufactured and sold by numerous companies and are well known articles of commerce.

Another suitable hydrocarbon wax is the Fischer-Tropsch wax. The Fischer-Tropsch waxes have been described in the literature. (See, for example, chapter 14 in "Fischer-Tropsch Processes," Weil and Lane, Constable & Co., Ltd., London, 1949). Also, see the paper presented during the 41st annual meeting C.S.M.A., New York, December 7, 1954, by Charles J. Marsel entitled "Fischer-Tropsch Waxes; Their Production Properties and Uses," and published in Soap and Chemical Specialties, vol. 31, No. 2, pp. 131.4, 157, 159 (1954).

The Fischer-Tropsch waxes are high molecular weight paraffins which are similar to the paraffinic waxes derived from petroleum. As a result, the lower molecular weight Fischer-Tropsch waxes are similar to scale wax and paraffin wax. The higher molecular weight ones are somewhat similar to tank bottom derived microcrystalline wax and those of even higher molecular weight are similar to the lower molecular weight polyethylenes. The Fischer-Tropsch waxes are composed of mostly straight chain linear paraffins with molecular weights of from about 300 up to 1,000 or 1,500. For the purpose of this invention, it is desirable to use a Fischer-Tropsch wax melting within the range of 80° to 110° C. These waxes will normally have a penetration as defined by the ASTM Test Method D5-25 of from between 0+ to around 10. All penetrations in this test are expressed in tenths of a millimeter and are obtained using a 100 g. total weight for five seconds at 77° F.

It is also possible and desirable to use the lower molecular weight polyethylenes of which there are about 3 or 4 types. Higher molecular weight polyethylenes may also be used, but because of their higher viscosity it is necessary to blend them with materials such as microcrystalline wax or paraffin wax et cetera.

The lower molecular weight polyethylenes which may be used can be prepared by either of three processes. By one process polyethylene is produced as described in U.S. Patent No. 2,504,400, dated April 18, 1950, to Erchak. Said patent characterizes the product in terms of the method of manufacture which is a process for the production of at least medium hard, high-melting waxes from ethylene which comprises maintaining ethylene under pressures between about 425 and 475 atmospheres and at temperatures between about 140° C. and 200° C. in contact with isopropanol in amount sufficient to occupy from about 5% to about 10% of the total volume of the reaction zone and containing from about 0.1 to about 2% by weight on the isopropanol of hydrogen peroxide on a 100% hydrogen peroxide basis. Polyethylenes can be made by this process having molecular weights from around 1,000 up to around 10,000 or higher. The lower molecular weight polyethylenes produced by this process are of low enough viscosity so that it is not necessary to blend in lower molecular weight hydrocarbons. However, the higher molecular weight materials such as those having molecular weights of around 2,000 and higher must be blended with lower molecular weight waxes such as paraffin wax, microcrystalline wax, etc.

A second type of polyethylene is that described by Ziegler in numerous patents such as U.S. Patent No. 2,699,457, dated January 11, 1955. These polyethylenes may have molecular weights such that the products are liquids on up to around 50,000 and higher. Those materials produced by this process which are wax-like in characteristics on up to materials having molecular weights of several thousand may be used without blending while those of higher molecular weight must be blended with lower molecular weight waxes for the purposes of this invention. This particular type of polyethylene is produced by polymerizing ethylene in the presence of an aluminum or certain other metal alkyl or hydride catalyst using lower pressures and temperatures. Polyethylenes made by this process are very crystalline, are hard and brittle and are considerably less flexible than the conventional polyethylenes. They have a density of approximately 0.95 whereas conventional polyethylenes will have a density of approximately 0.92.

Another polyethylene which is similar to that just described is that which is described by the Phillips Petroleum Company's Belgian Patent No. 530,617, dated July 22, 1954. This polyethylene is produced using a catalyst composed of chrome oxide on a silica alumina support and the physical properties of the product are very similar to those produced by the Ziegler process. See also the three papers on Marlex catalyst systems, molecular structure, and properties appearing in the preprints of the general papers of the Division of Petroleum Chemistry of the American Chemical Society, of February 1956, pp. 211–240.

The commercial polyethylenes (i.e., those that have been known for many years and which are well described in Kirk-Othmer, Encyclopedia of Chemical Technology; volume 10, pp. 938 through 957) may be used for the purposes of this invention when blended with lower molecular weight waxes. These polyethylenes are described by Figure 1 on page 941 of the just-mentioned reference.

Other polyethylenes, intermediate in properties between the high density, high crystalline polyethylene described by Ziegler and Phillips Petroleum Company and the conventional polyethylene produced by high pressure process may be used. One such polyethylene can be produced in conventional high pressure equipment used for making conventional polyethylene, by slight modifications of reaction conditions.

Materials such as polypropylene may also be used especially the solid wax-like polypropylenes which are crystalline in nature. It is best in many cases to blend these materials with other waxes. Polybutylene may also be employed, but generally where it is used it is necessary to blend it with other waxes such as microcrystalline wax, etc.

For purposes of this invention, it is also possible to use paraffin wax derived from petroleum. This wax is a well known article of commerce and is well described in "The Chemistry and Technology of Waxes" by Warth, published by Reinhold, 1947, pp. 217 to 239. Because of the low molecular weight and softer characteristic of this wax, it is generally necessary to blend it with other waxes and/or polyethylene of higher molecular weight and greater hardness.

It is also possible to use natural hydrocarbon waxes which are mined in this country and in other parts of the world. These go under such names as ozokerite, Utah wax, etc. These waxes are very plastic and in that respect closely resemble the plastic microcrystalline waxes derived from lube oil stocks and petrolatums. These waxes are described in the above-mentioned book by Warth, particularly on pages 195 to 202.

It is obvious that one can use blends of the above materials as the starting material for this invention, or one can make slight modifications which would involve processes such as solvent extraction to either harden or soften the wax or wax blends, or hydrogenation to remove unsaturation or to perhaps break naphthenic rings, or cracking to produce unsaturation, or polymerization of any unsaturates which may be present, etc.

Any of the above essentially non-benzenoid hydrocarbon waxes can be used as well as others of this type not mentioned, if they fulfill certain criteria. The hydrocarbon material must be solid at a temperature of approximately 120° F. or preferably higher and they must be susceptible to gaseous oxidation, using conventional methods including metallic catalysts, so as to yield an oxidized product having a saponification number of between 30 and 150. Furthermore, such oxidized products when reacted with products of Part 1 of this invention must yield homogeneous materials.

*Section B*

The art of oxidizing hydrocarbon waxes is old and has been extensively described in the literature. A variety of hydrocarbon waxes and comparable compounds principally hydrocarbon in nature have been subjected to oxidation in various manners and particularly by the use of air, ozone, or oxygen in the presence of an oxidation catalyst, such as a wax soluble organic salt such as manganese or cobalt naphthenate. Other ways of oxidizing hydrocarbon mixtures involve the use of materials such as the oxides of nitrogen and various chemical oxidizing agents such as chromic acid, hypochlorous acid, etc. Also, a hydrocarbon mixture can be subjected to very mild forms of oxidation such as cracking and the cracked products may be subjected to oxidation by such methods as the Oxo process, or other types to introduce oxygen containing functional groups such as carboxylic acids, alcohols, esters, etc.

For convenience, and for reasons of economy, it is preferred to carry out the oxidation by blowing with an oxygen containing gas at temperatures ranging from 240° to 340° F. for a sufficient length of time to give an appreciable acid and saponification number. This oxidation is preferably carried out in the presence of a catalyst such as a soluble cobalt or a manganese soap; such as a stearate, oleate, naphthenate, etc. Also, wax insoluble catalysts may be used such as potassium permanganate. These catalysts are used in concentrations ranging from 0.2 to 2%. Oftentimes, no catalyst is required, especially if the microcrystalline wax is pretreated with a metal halide such as aluminum chloride, or if the oxidation is catalyzed by previously oxidized wax. Sometimes it may be of some advantage to add a chlorinated paraffin or a blown drying oil before or during the oxidation.

This oxidation procedure can be carried out in manners described in numerous patents, such as U.S. Patent No. 2,249,708, dated July 15, 1941, to Hicks-Bruun; U.S. Patent No. 2,486,454, dated November 1, 1949, to Zellner; U.S. Patent No. 2,573,422, dated October 30, 1951, to Fish; and, U.S. Patent No. 2,674,613, dated April 6, 1954, to Nelson. Also, the three-part article entitled "Oxidation of Paraffins" by Ernest Stossel in The Oil and Gas Journal, vol. 44, No. 11, pp. 130-9; No. 15, pp. 145-51; No. 17, pp. 69-77 (1945) should be especially noted and also the 121 references in this article.

Following are two examples which illustrate a conventional procedure for oxidizing microcrystalline wax.

Example 1a

To 300 grams of a microcrystalline wax obtained from the settlings of East Texas crude, having a melting point of 190° F., a penetration of 4 (ASTM Test Method D5-25) and a light yellow color is added 1.5 grams of cobalt stearate. The resultant mixture is blown with air at a rate of 5 ml./g./min. until the product shows an acid number of 12. This oxidation is carried out at 290° F. and takes from two to sixteen hours to achieve, depending upon the degree of dispersion of the air. Using a fine screen as a disperser, the time of oxidation is about twelve hours and the product will be colored yellow and have a saponification number of 35 to 37.

Example 2a

To 300 grams of microcrystalline wax obtained from the settlings of East Texas crude, having a melting point of 190° F. is added 1.5 grams of manganese naphthanate. This resultant mixture is blown with air at a rate of 5 ml./g./min. at 320° F. until the product has an acid number of 10. The temperature is then lowered to 270° and air blowing is continued until the product shows an acid number of 33. By the use of a screen disperser, the time required for this oxidation is fifty hours and the product shows a saponification number of 80 and a penetration of 8. (ASTM Test Method D5-25).

These oxidations can be continued for even a longer period of time to give products having acid numbers up to 60 and saponification numbers up to 150. These products are all useful for the purpose of this invention. Higher temperatures may be used for this oxidation; however, the products in the invention will then be a little softer and darker in color.

Furthermore, dark colored microcrystalline wax or waxes bleached to a white color may be used. Also, lower air rates may be used, but in this case a greater degree of polymerization is encountered, and in certain instances, if this is carried to excess, very viscous products may be obtained by further reaction as described in Part 3. Air rates may be increased up to 10 or 15 or even high ml./g./min. to achieve faster oxidation or the air dispersion may be increased by use of mechanical stirring, or by using a disperser which gives very fine gas bubbles. By these latter procedures, good products may be obtained for the purposes of this invention. Many other modifications in the method of oxidation may be made as suggested in the patent literature.

The above examples describe oxidation processes using tank bottom derived microcrystalline waxes. The same general procedure can be used with other hydrocarbon materials previously described in Section A of this part.

Normally, it is possible to oxidize Fischer-Tropsch waxes using the same procedure as described above for microcrystalline wax. Following is an example using a Fischer-Tropsch wax.

Example 3a

To 300 g. of a Fischer-Tropsch wax having a melting point (capillary tube) of 212° F., a penetration (ASTM Test Method D5-25) of 5, an acid number, saponification number and hydroxyl value less than 1, a density of 68° F. of 0.925, and a white color, was added 1.5 g. of cobalt naphthenate. This mixture was oxidized at 290° F. to an acid number of 11 and then at 245° F. until the product had an acid number of approximately 23. The air rate (2–5 cc./g./min.) was adjusted so that the acid number increased at a rate of 0.5–0.8 acid number per hour. The product has an NPA color of 3½, a penetration (ASTM Test Method D5-25) of 10, a melting point (ASTM Test Method D127-30) of 201° F., an acid number of 23.4 and a saponification number of 63.5.

Other Fischer-Tropsch waxes of higher or lower molecular weight may be easily oxidized using the same procedure.

Example 4a

A Fischer-Tropsch wax having a melting point (capillary tube) of 221° F., a penetration (ASTM Test Method D5-25) of 1, an acid number, saponification number, and hydroxyl value of 0, a density at 68° F. of 0.933 and a white color, was oxidized as described in Example 3a to yield an oxidized product having an NPA color of 3½, a penetration (ASTM Test Method D5-25) of 4, a melting point (ASTM Test Method D127-30) of 201° F., an acid number of 23.2 and a saponification number of 67.5.

When waxes of lower molecular weight are used it is oftentimes possible to achieve oxidation at a lower temperature whereas with higher molecular weight compounds it is oftentimes necessary to go to higher temperatures. Also, as pointed out before, blends of various hydrocarbon waxes or other materials may be advantageously oxidized. Following are several examples in which blends of microcrystalline wax or paraffin wax with polyethylene are oxidized to give desirable products for use in the next section.

Example 5a

To 225 g. of a paraffin wax (56° C. melting point) is added 175 g. of a 2100 molecular weight polyethylene produced in the manner as described in the aforementioned U.S. Patent No. 2,504,400 (melting point of 102°

C. and a penetration of 3. The resultant mixture is heated to approximately 220° F. for one-half hour at which time a homogeneous mixture is obtained and shows no separation of constituents when cooled to room temperature. Air is blown through this mixture heated to 300° F., at a rate of approximately 5 ml./g./min. until acid number reaches approximately 17 (about 45 hours). Shortly after the air blowing procedure starts, there is added to the reaction mixture 2 g. of potassium permanganate in the form of an aqueous solution; a solution of 5% concentration. Rapid agitation is used so as to obtain fine dispersion of the insoluble catalyst thus formed in the wax mixture. By the use of this procedure, a light orange hard emulsifiable wax is obtained having a saponification value of from 45 to 55.

*Example 6a*

To 300 g. of tank bottom derived microcrystalline wax (190–195° F. melting point) is added 68 g. of a conventional polyethylene (average molecular weight approximately 20,000) and 32 g. of a polyethylene having an average molecular weight of 2100 and produced as described in U.S. Patent No. 2,504,400 (melting point of 102° C. and a penetration of 3). The resultant mixture is heated to approximately 320° F. for two hours at which time a homogeneous blend is obtained. To this material is added 2 g. of cobalt naphthenate and the temperature lowered to 290° F. Air is introduced at this temperature at a rate of approximately 3 ml./g./min. until an acid number of 17 is obtained. The time required for this oxidation is approximately 60 hours and the product will have a saponification number of 51, a melting point of 198° F., and a penetration of 3.

It should be borne in mind that all the above examples should not be meant to limit the scope of this invention. Any of a number of oxidation procedures can be used and any of a number of hydrocarbon materials previously described may be used. The main criterion for the purpose of this invention is that the wax be oxidized to a product having sufficient acid and saponification value, or hydroxyl value, so that they may be reacted with approximately 2 to 10% by weight of a compound selected from Part 1 of this application and that the final product is homogeneous. In general, it is found that the wax, to be sufficiently oxidized, should be oxidized such that it shows an acid value of at least 10 and a saponification value of at least 30. On the other hand, the wax should not be oxidized to too great an extent; otherwise, the final product may be too soft or viscous for the desired purposes. It is best to have an upper value for the acid number of 60 and for the saponification value of 150. It has been found that, even soft oxidized products can be materially improved by the reaction described in the next part, but it is always better to use a harder oxidized wax if it is economically feasible.

The above described oxidized products may be further improved or modified by various blending processes. For example, numerous oxidized waxes described above may be blended with each other to obtain certain desirable features or they may be blended with unoxidized hydrocarbon waxes to a certain extent. An example of such a blend is as follows.

*Example 7a*

To 240 g. of the product of Example 2a is added 60 g. of the product of Example 6a and the mixture is heated with stirring at 115° C. for 15 minutes at which time a completely homogeneous product is obtained. The product of this example has an acid number of 30, a saponification number of 74, a penetration of 5½ and a melting point of 187° F.

PART 3

As has been stated before, when an organic compound, i.e., one with a structure —X=C=Y as previously defined, of Part 1 or a combination of organic compounds of Part 1 are reacted with the oxidized products of Part 2, or a combination of products from Part 2, very useful products may be obtained.

The nature of the product is determined to a large extent by various reaction variables. The weight percentage and type of diisocyanate is of importance. The word "diisocyanate" is being used in this section for the sake of convenience and it should be remembered that, in general, all types of organic compounds may be used as described in Part 1 of this invention. Also, the type of oxidized wax, the degree of oxidation of the wax, the reaction time and the reaction temperature, all have an effect on the product. One of the most important variables in this reaction is the effect of small concentrations of water. It is not definitely known whether the water acts as a catalyst or a reactant or both, but it is felt that it is actually a reactant. It has also been found that, when water is added to the reaction, the rate of stirring may oftentimes be very important. Each of these variables will be described in greater detail later.

The products prepared in this invention were tested for one or more properties and these will be outlined now for sake of clarity, and in order to evaluate the effect of the reaction variables. The acid number of the product was determined by titrating an n-butyl alcohol solution of sample with 0.1 N potassium hydroxide in butyl alcohol using phenolphthalein as the indicator. The results are reported in milligrams of potassium hydroxide per gram of sample. The melting point of the product was obtained as the continental solid point as described in Holde and Mueller, "Examination of Hydrocarbon Oils and Saponifiable Fats and Waxes," 2nd ed., New York, John Wiley & Sons, 1922. The penetration was determined by the ASTM Test Method D5–25, using a 100-gram total weight for five seconds at 77° F. and the results are reported in tenths of a millimeter.

The ability of a wax to disperse carbon was determined by the following carbon dispersion test; a mixture containing 1.0–2.5 g. (4–10%) of wax on test and 20.5–19.0 g. (82–76%) of a 100 SUS viscosity mineral oil at 100° C. as exemplified by Texaco Ink Oil #538 (Texas Co.) was heated with stirring in a 500 ml. round bottom flask until the temperature reached 95–100° C., and a solution was obtained. To this solution was added 3.5 g. (14%) of a channel black such as exemplified by Kosmos 40 (United Carbon Company) and approximately 20 g. of 3 mm. diameter glass beads. The mixture was then stirred at 95–100° C. for 30 minutes, using a stirrer which scraped the sides of the flask. A drop of the ink so prepared was placed on an absorption cell. This cell was fitted into a slide and through the cell a glycerol-water solution was circulated at 95° C. The sample was covered with a cover glass which was pressed with a tweezers and then viewed under a microscope at ×200. The inks were then classified as being types A, B, C, or D (type A describing the best dispersion) as described in the paper on the "Rheology of Carbon Paper Inks" by E. S. Gale and B. J. Staneslow from the American Ink Maker of December 1950.

The oil retention penetration, which is a measure of the hardness of a wax-oil blend, was determined as follows: 25 grams of wax on test and 25 g. of a 100 SUS viscosity mineral oil as exemplified by Texaco Ink Oil #538 were placed in a 150 ml. beaker which was covered by a watch glass and placed in an oven at 100° C. for two hours. The sample, after stirring with a glass rod, was then poured into an aluminum foil dish (Fisher Scientific Co. Cat. No. 8–732), resting on asbestos and then covered by a 600 ml. beaker. After being allowed to stand for one hour, the sample was transferred to a water bath at 25.0±0.2° C. and kept there for 3–4 hours. A penetration was then taken on the sample with a standard ASTM needle under a total load of 100 g. for 5 seconds, and the results were reported in tenths of a millimeter (see ASTM Test Method D5–25).

The oil retention or the ability of a wax to hold oil in a wax-oil blend was determined by placing the wax-oil mold from the preceding test on a piece of filter paper after allowing it to remain at room temperature for one hour. A second piece of filter paper was placed on top of the wax-oil mold, and on top of this was placed a 100-gram distributed weight having the same cross-sectional dimensions as the wax mold. After one hour at room temperature, the bottom piece of filter paper was examined visually for oil bleed. If only a trace of oil was noticed, i.e., a ring of oil or a broken ring, having a thickness of less than a millimeter, it was classified as Type 1. If a ring was noted having a thickness of from one to five millimeters, it was classified as Type 2; if a ring of thickness from five to ten millimeters was observed, it was classified at Type 3; if the ring thickness was from 10 to 20 millimeters wide, it was classified as Type 4; and anything greater was classified as Type 5. Type 1 bleed would be considered good, Type 2 fair, and Types 3, 4 and 5 from poor to very poor.

The type of diisocyanate which is used in the practice of this invention has been found to have a pronounced effect on the nature of the product, but each diisocyanate has been found to modify the nature of the product to some degree so that the resultant would show improvement over the starting material for adaptation for certain uses. Oftentimes, different isomers will unpredictably give different results. These differences in results will be pointed out more specifically in the examples which will follow at the end of this part.

From one to ten percent of diisocyanate can be reacted with the oxidized wax to give a markedly improved product. The preferred concentration of diisocyanate is from three to six percent. It has been found that the hardness of the product will gradually increase, quite pronounced at first, as the percentage of diisocyanate is increased; however, with higher percentages of diisocyanate, some incompatability is encountered. It is also observed that, at first, the oil retention penetration is lowered (the oil wax blend is hardened), but as higher percentages of diisocyanate are used (6 to 8 or higher percent) the oil retention penetration starts to increase. There is a gradual increase in melting point and viscosity as the percentage of diisocyanate is increased. The ratio of reactants can be within the range of 92–98% of the oxidized wax and 8–2% of the polyisocyanate.

The reaction time and the reaction temperature also have an effect on the nature of the product. The preferred reaction time is from one to eight hours. The most pronounced changes in the nature of the product occur during the first hour or two and then there is a gradual improvement in some of the properties, i.e., penetration and oil retention penetration; and there may be a slight reduction in the dispersing ability of the product as the reaction time is prolonged. These reactions are normally carried out at temperatures just above the melting point of the wax on up to 140° C. and higher. It is preferable to carry out the reaction at lower temperatures so as to obtain products of lighter color and other slightly improved properties. Very little discoloration of the oxidized wax is obtained when it is reacted with diisocyanate at 90° C. but it is preferred to carry out the reaction at slightly higher temperatures for the sake of convenience.

The addition of water to the reaction mixture at the beginning of the reaction has a most pronounced effect on the nature of the product in many instances. Concentrations of water as low as 0.05% will materially affect the course of reaction and, sometimes, concentrations up to 0.5 or 1% of water are used. The preferred water concentration is from 0.05 to 0.3%. In many instances, it is not necessary to add any water to the reaction mixture and the reaction is carried out under substantially anhydrous conditions. In this latter case, however, this may not be the real story, for when oxidized wax is heated up there is always the chance that water may be formed by dehydration, esterification, or the like. Also, it has been found that, in general, oxidized hydrocarbon waxes, and particularly those obtainable on the open market, will contain some moisture (approximately 0.03–0.1% and higher) as determined by an azeotropic distillation with benzene. If too much water is used, it has been noticed that some insolubility is encountered in the final product, particularly in the solid state, but normally these products are homogeneous in the liquid state. This is especially true when higher percentages of diisocyanate and/or water are used. It is not exactly understood whether the water acts as a catalyst or a reactant, or both, but it is felt that at least to a certain extent it is a reactant. It has been found that, as the concentration of waer is increased, up to a certain point, there is a gradual improvement in such properties; such as, oil retention penetration and oil retention. The reaction can be advantageously conducted in the presence of between at least one mole of water to ten moles of polyisocyanate and less than one mole of water to one mole of polyisocyanate.

It has also been found that, when water is added to the reaction mixture, oftentimes, the rate of mechanical stirring has a pronounced effect on the product and this may be due to a large extent to the fact that the reaction is heterogeneous when several tenths of a percent of water is added.

Investigation of additives other than water or in conjunction with water was pursued using materials in small concentrations such as urea, ammonium hydroxide, hydrochloric acid, hydrogen peroxide, hydrogen sulfide, ethylene diamine, ethanolamine, paraformaldehyde and similar low molecular weight compounds containing active hydrogens. When these materials were added, useful products were obtained in many instances. It has been found that when trace quantities (i.e., 0.5–0.3%) of ethylene-diamine or ethanolamine, or related materials are added at the beginning of the reaction a more homogeneous or, in many cases, a completely homogeneous product is obtained when normally heterogeneous products are obtained (i.e., when larger quantities of diisocyanate and/or water are used).

It is also possible to react the diisocyanate with glycols such as ethylene glycol, propylene glycol, triethylene glycol, tetraethylene glycol, butylene glycol, and higher homologues and similar type compounds; diethylene glycol, dipropylene glycol, dibutylene glycol, and higher molecular weight compounds of this general type; analogous amine and amine alcohol type compounds; and, other polyhydric and/or polyamines. It is best to use an excess of a diisocyanate so that the resultant will have free isocyanate groups. These resultants can then be reacted with oxidized waxes to yield improved products, but these findings are not part of the instant invention.

The type of hydrocarbon wax has an influence on the nature of the product. However, regardless of which oxidized wax is used, there is a pronounced improvement in the hardness and other properties of the product.

The reaction mechanism encountered when an oxidized wax is reacted with a diisocyanate is not fully understood, but it is known that when an isocyanate is reacted with an alcohol, a urethane is formed; when it reacts with a carboxylic acid an amide plus carbon dioxide is formed; when it reacts with an active methylene compound an amide is formed; and when it reacts with water an amine plus carbon dioxide is formed, and the resulting amine may react with another molecular of isocyanate to form a substituted urea. In general, an isocyanate will react with an amine in preference to water, with water in preference to an alcohol, with an alcohol in preference to a carboxylic acid, and with a carboxylic acid in preference to an active methylene group. Under certain conditions, isocyanates will also polymerize, act as dehydrating agents, etc.

When an oxidized wax, for example, is reacted with 4% of tolylenediisocyanate and 0.2% of water, there are approximately two moles of the diisocyanate to one mole of water. It may happen that one mole of diisocyanate will react with the water to give a molecule containing an amine and an isocyanate group, and the amine portion of a molecule may react with the second diisocyanate to give a disubstituted urea containing two isocyanate groups. This is probably most true when a diisocyanate is used such as tolylene-2,4-diisocyanate containing two isocyanate groups of different reactivity. This resulting diisocyanate compound may then, in turn, react with the wax acids or alcohols or other active centers. As lesser amounts of water are available, there are more isocyanate groups to react with active centers in the oxidized wax. On the other hand, when proportionately greater amounts of water are used, the disubstituted urea containing two isocyanate groups may react further with water (which is more reactive than the active groups in the oxidized wax) to give longer chain molecules and, as a result, in some instances, insolubility in the finished material. This discussion of the reaction mechanism is somewhat speculative. However, it is felt that such presentation represents at least to a partial extent an explanation of what actually occurs, and gives some indication of the underlying rationale of the reactions involved.

When an oxidized wax is reacted with a diisocyanate there is a marked unpredictable improvement in certain of the properties of the product. As far as is known, no one has been able to desirably improve any or a combination of several properties of an oxidized wax by adding or reacting the latter with small percentages of one or more heretofore employed reactants. In most instances, the improvements which have been achieved by use of the present process cannot be accomplished, even when as much as 10, 15 or 20% of some other material or compound is allowed to react with an oxidized or unoxidized wax. By the procedure of this invention it has been possible to obtain a great improvement in the hardness of the wax, for example, an improvement in penetration of from eight to three or from six to two; also, to achieve a reduction in the oil retention penetration of from greater than 150 to 60 and even less. In addition, many of the products of this invention show good oil retention and also have the ability to disperse carbon to a better extent than the original oxidized microcrystalline wax or even the natural waxes such as carnauba and ouricury. For many purposes, with these improvements of oxidized wax with diisocyanates it is possible to produce a synthetic wax which has all or most of the desirable characteristics of carnauba and ouricury for many types of carbon paper ink applications.

The following examples will illustrate more specifically what has been stated above. These reactions, characteristic of the present process, were carried out by first melting 300 grams of wax in a glass reaction vessel. The temperature was held at 5° C. below the reaction temperature; for instance, 90° C. to 140° C., and if water was added, it was added at this point and then the diisocyanate was added rapidly. Normally, there was an exothermic reaction and the temperature rose 3 to 5° C. The reaction mixture, during the course of the reaction, was mechanically agitated with a metal stirrer. The following table illustrates the effect of many of the reaction variables and describes in greater detail what has been said above.

TABLE I.—REACTANTS AND REACTION CONDITIONS

| Series | Run No. | Wax | Diisocyanate | Percent Diisocyanate | Percent H₂O added | Reaction temp., °C. | Reaction time (hrs.) | Stirring rate r.p.m. |
|---|---|---|---|---|---|---|---|---|
| I | 480 | A | TDI | 4 |  | 115 | 6 | (*) |
| I | 464 | A | TDII | 4 |  | 115 | 6 | (*) |
| I | 438 | A | MDI | 4 |  | 115 | 6 | (*) |
| I | 037 | A | NDI | 4.7 |  | 115 | 6 | (*) |
| I | 468 | A | BTDI | 4 |  | 115 | 6 | (*) |
| II | 429 | A | TDI | 2 |  | 115 | 6 | (*) |
| II | 443 | A | TDI | 3½ |  | 115 | 6 | (*) |
| II | 480 |  |  |  | see above |  |  |  |
| II | 444 | A | TDI | 4½ |  | 115 | 6 | (*) |
| II | 440 | A | TDI | 6 |  | 115 | 6 | (*) |
| II | 441 | A | TDI | 8 |  | 115 | 6 | (*) |
| II | 520 | B | TDI | 3½ | 0.2 | 115 | 6 | (*) |
| II | 509 | B | TDI | 4 | 0.2 | 115 | 6 | (*) |
| II | 517 | B | TDI | 5 | 0.2 | 115 | 6 | (*) |
| II | 515 | B | TDI | 6 | 0.2 | 115 | 6 | (*) |
| III | 431 | C | TDI | 4 |  | 115 | 6 | (*) |
| III | 423 | B | TDI | 4 |  | 115 | 6 | (*) |
| III | 461 | D | TDI | 4 |  | 115 | 6 | (*) |
| III | 480 |  |  |  | see above |  |  |  |
| III | 433 | E | TDI | 4 |  | 115 | ½ | (*) |
| III | 475 | F | TDI | 4 |  | 115 | 6 | (*) |
| IV | 427a | B | TDI | 6 |  | 115 | 1 | (*) |
| IV | 427B | B | TDI | 6 |  | 115 | 3 | (*) |
| IV | 427 | B | TDI | 6 |  | 115 | 6 | (*) |
| IV | 700 | B | TDI | 6 |  | 115 | 12 | (*) |
| V | 437 | A | TDI | 4 |  | 90 | 6 | (*) |
| V | 480 |  |  |  | see above |  |  |  |
| V | 436 | A | TDI | 4 |  | 140 | 6 | (*) |
| V | 546 | B | TDI | 4 | 0.2 | 90 | 6 | 450 |
| V | 568 | B | TDI | 4 | 0.2 | 115 | 6 | 450 |
| VI | 423 |  |  |  | see above |  |  |  |
| VI | 508 | B | TDI | 4 | 0.05 | 115 | 6 | (*) |
| VI | 513 | B | TDI | 4 | 0.1 | 115 | 6 | (*) |
| VI | 519 | B | TDI | 4 | 0.15 | 115 | 6 | (*) |
| VI | 509 |  |  |  | see above |  |  |  |
| VI | 514 | B | TDI | 4 | 0.3 | 115 | 6 | (*) |
| VII | 564 | B | MDI | 5.8 | 0.2 | 115 | 6 | 300 |
| VII | 565 | B | MDI | 5.8 | 0.2 | 115 | 6 | 400 |
| VII | 566 | B | MDI | 5.8 | 0.2 | 115 | 6 | 500 |
| VII | 561 | B | TDI | 4 | 0.2 | 115 | 6 | 300 |
| VII | 562 | B | TDI | 4 | 0.2 | 115 | 6 | 400 |
| VII | 563 | B | TDI | 4 | 0.2 | 115 | 6 | 500 |
| VII | 582 | B | HMDI | 3.4 | 0.2 | 115 | 6 | 350 |
| VII | 583 | B | HMDI | 3.4 | 0.2 | 115 | 6 | 500 |
| VIII | 593 | G | TDI | 4 | 0.2 | 115 | 6 | 350 |
| VIII | 592 | H | TDI | 4 | 0.2 | 115 | 6 | 350 |
| VIII | 474 | I | TDI | 4 |  | 115 | 6 | (*) |
| VIII | 473 | J | TDI | 4 |  | 115 | 6 | (*) |
| VIII | 702 | K | TDI | 3 |  | 115 | 6 | (*) |
| IX | 493 | L | TDI | 4 |  | 115 | 6 | (*) |

*Between 325–375 r.p.m. but not accurately determined.

TABLE I.—Continued—PRODUCTS

| Series | Run No. | Solid. Point, °F. | Penetration, 100/5/ 77° F. | Acid No. | Dispersion 8% | Dispersion 6% | Dispersion 4% | Oil Retention | Oil Retention Penetration |
|---|---|---|---|---|---|---|---|---|---|
| I | 480 | 185 | 3 | 28 | | | A | 2 | 63 |
| I | 464 | (**) | 3− | | | | | 2 | 150 |
| I | 438 | 184 | 3+ | | | B | | 4 | 83 |
| I | 037 | | | | | | | | 150 |
| I | 468 | 184 | 2+ | | | B | | 3 | 150 |
| II | 429 | 184 | 4 | 30 | | B | | 3 | 126 |
| II | 443 | 184 | 3− | | | | | 1 | 69 |
| II | 480 | | | | see above | | | | |
| II | 444 | 185 | 2+ | | | | | 2 | 65 |
| II | 440 | 184 | 2+ | | | | | 3 | 83 |
| II | 441 | 184 | 2+ | | | | | 3 | 105 |
| II | 520 | 185 | 2+ | | | | | 1 | 56 |
| II | 509 | 185 | 2+ | | | | | 1 | 52 |
| II | 517 | 185 | 2+ | | | | | 1 | 59 |
| II | 515 | 185 | 2 | | | | | 1 | 72 |
| III | 431 | 183 | 3+ | 15 | | A | B | 5 | 150 |
| III | 423 | 185 | 2+ | 21 | | B | | 1 | 86 |
| III | 461 | 184 | 2+ | | | | | 1 | 63 |
| III | 480 | | | | see above | | | | |
| III | 433 | | | | product turned to rubber | | | | |
| III | 475 | 180 | 4+ | | | | A | 3 | 150 |
| IV | 427a | 182 | 3+ | | | | | 1 | 113 |
| IV | 427b | 185 | 3− | | A | B | | 1 | 109 |
| IV | 427 | 185 | 2+ | | B | B | | 1 | 86 |
| IV | 700 | 185 | 2 | | | | | 1 | 73 |
| V | 437 | 185 | 3+ | | | A | B | 1 | 78 |
| V | 480 | | | | see above | | | | |
| V | 436 | 185 | 3+ | | | A | B | 2 | 79 |
| V | 546 | 185 | 3+ | | | | | 2 | 86 |
| V | 568 | 185 | 2+ | | | | | 2 | 74 |
| VI | 423 | | | | see above | | | | |
| VI | 508 | 185 | 2+ | | | | | 2 | 71 |
| VI | 513 | 185 | 2+ | | | | | 1 | 54 |
| VI | 519 | 185 | 2+ | | | | | 1 | 53 |
| VI | 509 | | | | see above | | | | |
| VI | 514 | 185 | 2+ | | | | | 1 | 59 |
| VII | 564 | 185 | 2 | | | | | 3 | 110 |
| VII | 565 | 185 | 2 | | | | | 3 | 68 |
| VII | 566 | 185 | 2 | | | | | 3 | 59 |
| VII | 561 | 185 | 2+ | | | | | 1 | 68 |
| VII | 562 | 185 | 2+ | | | | | 2 | 62 |
| VII | 563 | 185 | 2 | | | | | 2 | 71 |
| VII | 582 | 184 | 3 | | | | | 3 | 103 |
| VII | 583 | 184 | 3+ | | | | | 3 | 122 |
| VIII | 593 | | 5 | | | | | 5 | 88 |
| VIII | 592 | | 2+ | | | | | 5 | 82 |
| VIII | 474 | 186 | 1½ | | | | | 5 | 53 |
| VIII | 473 | 186 | 2− | | | | | 5 | 58 |
| VIII | 702 | 190 | 1− | | | | | 5 | 40 |
| IX | 493 | 184 | 2½ | | | | | 2 | 98 |

**Too viscous to measure.

TABLE I.—NOTES

Wax A is a wax oxidized according to Example 2a to an acid number of 33, saponification number of 80, penetration of 8, and a melting point of 184° F.

Wax B is a wax oxidized according to the method of Example 2a except that the oxidation is stopped when the product has an acid number of 22, saponification number of 58, penetration of 6− and a melting point of 184° F.

Wax C is oxidized according to the method of Example 2a except that the air rate is reduced and the oxidation is stopped when the material has an acid number of 15, a saponification number of 45, penetration of 5 and a melting point of 185° F.

Wax D can be prepared in the manner described in Example 1a and it has an acid number of 33, a penetration of 6+ and a melting point of 182° F.

Wax E is prepared according to the method of Example 1a at a very slow air rate so that the length of oxidation is about 60 to 70 hours. This product has an acid number of 12, saponification number of 70, penetration 4 and is very viscous and dark colored.

Wax F is produced by the method described in Example 1a using a relatively fast oxidation and this wax has an acid number of 51 and a penetration of 11.

Wax G is the oxidized Fischer-Tropsch wax described in Example 3a.

Wax H is the oxidized Fischer-Tropsch wax described in Example 4a.

Wax I is the blend described in Example 7a.

Wax J is a blend of 270 g. of the product of Example 2a and 30 g. of the product of Example 6a prepared as described in Example 7a.

Wax K is the oxidized wax described in Example 5a.

Wax L is an oxidized microcrystalline wax prepared according to Example 2a with the modification that it was blown with dry nitrogen after oxidation so that the resultant wax contained less than 0.01% water.

The isocyanate TDI is tolylene-2,4-diisocyanate, sometimes referred to as toluene-2,4-diisocyanate or 1-methylphenylene-2,4-diisocyanate.

Isocyanate TDII is composed of a mixture of 65% tolylene-2,4-diisocyanate and 35% tolylene-2,6-diisocyanate.

Isocyanate MDI is diphenylmethane-4,4'-diisocyanate.
Isocyanate NDI is naphthylene-1,5-diisocyanate.
Isocyanate TBDI is 3,3'-bitolylene-4,4'-diisocyanate.
Isocyanate HMDI is hexamethylene diisocyanate.

The products described in the above examples do not necessarily have all the desired characteristics which would make them useful for all the formulations described in Parts 4 and 5, but with few exceptions they are very much superior to the oxidized hydrocarbon wax from which they are made. One of the most striking improvements in the oxidized hydrocarbon waxes is that of penetration (hardness), oil retention penetration (i.e., hardness of a wax oil mixture), oil retention (ability of the wax to hold oil without bleeding), and ability to disperse carbon black and other pigments. These waxes also appear more abrasion resistant and glossier than the precursor oxidized waxes and there is no noticeable change in emulsifiability.

In most cases, there seems to be some increase in the viscosity of the products over the starting wax, although in some cases there is a marked increase, especially when TDII or TBDI is used. This can sometimes be partially alleviated by increasing the stirring rate.

The Series I examples in Table I illustrate the effect of varying the isocyanate, keeping all other variables constant. It should be noted how each of these diisocyanates affect the nature of the product, TDI giving, in general, the best product.

The Series II examples in Table I illustrate the effect of varying the concentration of an isocyanate.

The Series III examples in Table I show the effect of varying the degree and kind of oxidation of the wax.

The Series IV examples in Table I show the effect of varying the reaction time.

The Series V examples show the effect of varying the temperature on the nature of the product.

The Series VI examples in this table illustrate the effect of adding various concentrations of water to the reaction mixture.

The Series VII examples illustrate the effect of varying the stirring rate when water is added.

The Series VIII examples illustrate the use of other oxidized hydrocarbon waxes along with blended oxidized waxes.

The Series IX example shows the effect of using a dried wax.

As has been stated above, it is felt that when higher concentrations of water are used; for example, several tenths of a percent, a heterogeneous reaction takes place and it would then be expected that the rate of stirring would have an effect on the course of the reaction. This is not always encountered and is most pronounced with wax B.

Rather than adding the water to the wax before the diisocyanate it can be added afterwards, either all at once or in small increments. Also, it may be added by passing a stream of gas such as nitrogen saturated with water through the reaction mixture during the reaction.

It is interesting to note that the addition of water before or during reaction generally has a pronounced beneficial effect on the hardness and oil retention properties of the product. Oftentimes, it is not necessary to add water for, often, there is sufficient water present in the wax. This water may be present in two forms, i.e., in the free state, or as water which can be generated during the reaction by dehydration of alcohols, esterification of free alcools and acids, decomposition of peroxides, or by other means. An indication of the amount of free water in wax can easily be determined by a quick azetropic distillation of the water in the wax with anhydrous benzene. An indication of the amount of water which can be generated during the reaction can be determined by using the same method but employing a higher boiling solvent such as toluene or xylene and allowing the distillation to proceed for about six hours. In general, there is found to be approximately 0.03–0.1% of free water in the wax and about an equal amount of which can be generated. For the purposes of this invention water is meant to include that which is present in the free state in the wax and that which is capable of being generated. By added water is meant that water which is externally added before or during the reaction of the wax with diisocyanate. The wax can be reacted under fairly anhydrous conditions such as by dehydrating the wax by blowing it with a dry inert gas, by heating it under a vacuum, or by an azeotropic distillation. By reacting such produced waxes, fair products are obtained for some carbon paper ink applications but these products are, in general, less satisfactory than those made from oxidized waxes containing traces of water because they have poorer oil retention penetrations (i.e., they produce softer wax-oil blends) and thus are inefrior when used in carbon paper inks (cf. run members 480 and 493 in Table I). The reason for this phenomenon which is particularly evident when oxidized tank bottom microcrystalline waxes are used is not clearly understood. However, it should be noted that when the dehydrated oxidized hydrocarbon waxes are reacted with diisocyanates a product is obtained which is superior to the starting wax, but in general they are not as satisfactory as those produced from a non-dehydrated oxidized wax.

Useful products may also be prepared in some cases by first reacting the diisocyanate with water and then reacting the resultant with the oxidized wax. The diisocyanate has been reacted with water by allowing a thin layer of the diisocyanate to remain in the atmosphere and react with the moisture in the air for several days. Also, the diisocyanate dissolved in a solvent such as benzene or heptane can be reacted with water in a closed container and the resultant can then be removed by filtration. The diisocyanate-water reaction product can then be added to the oxidized wax and the reaction continued as described above. By the use of these procedures it is generally necessary to filter the product to remove small amounts of insoluble material. By these methods, useful products can be obtained which show many of the advantages of the products previously described. The fact that significant improvement in the oxidized wax can be made by this procedure shows that water may, indeed, actually be a reactant rather than a catalyst for the purposes of this invention.

The following parts will ilustrate how the products of this part may be utilized in carbon paper inks.

PART 4

This part deals with the use of the products which are produced as described in Part 3 in carbon paper inks. There are several articles, patents, and other published literature which discuss various types of carbon paper, particularly in regard to formulation of the various ingredients, test procedures, utilization of various waxes, etc. See, for example, U.S. Patent No. 2,426,248, dated August 26, 1947, to Sugarman; chapter 12 entitled "Carbon Papers and Other Duplicating Papers" by R. R. Wissinger in the book edited by R. H. Masher entitled Specialty Papers published by the Chemical Publishing Co., New York, in 1950; the paper on the "Rheology of Carbon Paper Inks" by E. S. Gale and B. J. Staneslow in the American Ink Maker, issue of December 1950; the paper in "Converting of Carbon Papers" by F. B. McFarland in the Paper Trade Journal, vol. 137, pages 230–237 (1953); and the book Commercial Waxes by H. Bennett, pages 368, 377 and 429–431, published by Chemical Publishing Co., New York, in 1944.

There are many different types of carbon paper and related materials in use today. The three most widely used types of carbon paper are the one-time carbon which is used once and then thrown away, the pencil carbon which may also be used once, or may be used many times and the typewriter carbon. The one-time carbon is the most widely used type of carbon paper and it finds wide application in business and multiple forms and other applications. In the production of one-time carbon paper, cost is all important. On the other hand, for typewriter carbons, quality rather than cost is important, and, for pencil carbons, cost and quality are intermediate in importance.

The carbon paper ink may be viewed simply as a mixture containing a wax, an oil, a pigment and a dye. The oil serves as the vehicle and the pigment and dye give the color and some of the body. Most of the desirable characteristics in the finished ink must be supplied by the wax and these will be described later. Other materials may also be used in carbon paper to give it certain properties. For example, petrolatum may be used as part or all of the vehicle to impart certain properties such as plasticity and toughness, and paraffin wax may be used as a substitute for part of the wax to give a cheaper formulation. One of the unique properties of many of the waxes described in Part 3 of this invention is that they are able to carry a lot of paraffin wax into the ink formulation without detracting greatly from the desirable characteristics required. In this respect, these products are comparable to carnauba and ouricury and superior to montan, and the precursor oxidized hydrocarbon material. Other materials may be used in carbon paper inks such as clay to cheapen the formula, oleic acid which acts as a dye solubilizer, rubbers to give toughness, dispersing agents, etc.

The consistency and other properties of the ink can be varied to a certain degree by the choice of the oil which is used. For example, various oils ranging from a relatively light mineral oil (100 SUS at 100° F.) up to heavy oils and petrolatums may be used. These oils and petrolatums may be colorless or range in color up to black. The darker colored materials are generally better dispersants for the pigment.

There are numerous pigments which may be used in typical formulations. The most common pigment is carbon black and this comes in numerous grades such as channel blacks, furnace blacks, etc., and each of these grades come in many modifications. The channel blacks are, in general, the most desirable as far as quality is concerned, but on the other hand, they are also the most expensive. The high-grade channel blacks have an oxygenated surface which aids in its dispersion and which can adsorb the dye and other materials. As one goes down the scale of carbon blacks, lesser amounts of this very desirable oxygenated surface are encountered. Blue pigments may also be used, such as Milori Blue, and others, as can many other blue pigments. Numerous other colored pigments may also be used as described in the literature.

Many dyes are commonly employed in carbon paper inks. The common ones are methyl violet, nigrosine, Victoria blue, etc., and salts of these materials. It is advantageous to use a dye which is soluble in the wax, but if this is impossible, a solubilizer must be used. One of the advantages of using products of this invention is that the dye is soluble in the wax and no solubilizer is necessary. In general, any solubilizer which is used will detract from the qualities of the finished ink, i.e., will cause dye bleed, soften the ink, cause frosting, etc. In some instances, it is possible to completely eliminate the dye, but this is the exception rather than the rule.

A wax, to be useful for this purpose, must have many specific properties when used in a small concentration in the finished ink; for example, in concentrations of from 8 to 12% in one-time carbon paper inks, or in higher percentages, up to 30 or 40%, in typewriter carbons.

It seems that most of the desirable characteristics required in a carbon paper ink must be imparted by small percentages of wax. This is particularly true of one-time carbon paper inks. Since these waxes must have so many specific characteristics, which seem to be specific for only carnauba and ouricury wax, it is not surprising that these two natural waxes are widely used as one of the components of carbon paper inks and that there are no synthetic materials which can completely replace these materials in the percentages in which they are used. It was quite surprising that many of the products described in Part 3 of this invention had a combination of all the desirable characteristics required and that the materials served as complete replacements for the expensive natural waxes, carnauba and ouricury in many applications.

To be useful for carbon paper inks a wax must be able to dissolve the dye, such as methyl violet, Victoria blue, nigrosine, etc., preferably without the addition of a solubilizer, such as oleic acid. In this respect, the waxes of this invention are much superior to the natural waxes carnauba, ouricury, and montan which are almost universally used in one-time carbons. A wax must also produce good flow in a one-time carbon paper ink so that a thin uniform coating can be obtained. To produce good flow, a wax should give an ink of low viscosity, no thixotropy and no yield value (be Newtonian). The dispersion of the carbon black and the viscosity of the wax are the important variables which influence the flow of the finished ink. The ability of a wax to disperse carbon can be measured by the procedure described by Gale and Staneslow in the aforementioned article. If a wax gives a B-type dispersion or better, at 6%, no flow difficulties would be expected. Also, in this respect, many of the products of this invention are equal to or superior to the natural waxes ouricury, carnauba and montan, and as a group far better than the starting oxidized hydrocarbons.

A wax must also yield a finished ink which is hard and which will not bleed oil. These properties can be easily tested, at least to a certain degree, by determining the oil retention penetration and the oil retention of a wax oil blend. In this respect, the waxes of this invention show great value and are comparable in many cases to carnauba, ouricury and montan.

It was quite unpredictable that, when an oxidized wax is reacted with a diisocyanate, a new material could be formed which had a combination of all the desirable properties which are necessary for a carbon paper ink. Following is a formulation employing waxes of this invention for a one-time carbon of medium intensity:

| Grams | Material |
| --- | --- |
| 12 | Product of run No. 480 in Table I. |
| 20 | Paraffin Wax (M.P. approx. 135° F.). |
| 17 | Carbon black. |
| 1 | Methyl Violet. |
| 50 | Mineral Oil. |

The paraffin wax used is a high-melting-point paraffin and the oil is a 100-second oil at 100° F. The carbon black can be a channel black such as exemplified by Peerless Beads or a cheaper channel black such as Raven 15, manufactured by Columbian Carbon Company, or a furnace black as exemplified by Statex B-12 manufactured by Columbian Carbon Company. Considering cost and the properties of the finished ink, the best of the above blacks is Raven 15.

The above formulation may be modified in several ways to give different intensities and grades of ink; for example, clay can be substituted for some of the carbon black and oil to cheapen the formula without greatly impairing quality, and other variations in the proportions of wax may be made.

A similar one-time carbon paper formulation employing clay is as follows:

| Grams | Material |
| --- | --- |
| 12 | Product of run No. 480 in Table I. |
| 25 | Paraffin Wax (M.P. approx. 135° F.). |
| 0.5 | Methyl Violet Hydrochloride. |
| 1 | Nigrosine base. |
| 18 | ASP-100 clay. |
| 10 | Carbon Black. |
| 17 | 300 sec. Mineral Oil. |
| 16.5 | Petrolatum. |

One type of carbon black which may be used is a channel black such as Peerless Beads or a cheaper channel black such as Raven 15 or comparable products, or mixtures of these. These waxes also find use in other types of carbon paper and ribbons such as pencil carbons, typewriter carbons, typewriter ribbons, etc. A typical one-time medium blue pencil carbon formulation is as follows:

| Grams | Material |
| --- | --- |
| 12 | Product of run No. 520 in Table I. |
| 25 | Paraffin Wax (M.P. approx. 135° F.). |
| 18 | ASP-100 Clay. |
| 20 | Milori blue. |
| 13 | 300 sec. Mineral Oil. |
| 12 | Petrolatum. |

A typical typewriter formulation is as follows:

| Grams | Material |
| --- | --- |
| 25 | Product of Run No. 509 in Table I. |
| 18 | Carbon black ("Raven 15"). |
| 1 | Methyl Violet. |
| 10 | Paraffin Wax (M.P. approx. 135° F.). |
| 16 | 300 sec. Mineral Oil. |
| 30 | Petrolatum. |

As above, this formulation may be modified in many ways to obtain carbon paper to fit individual uses.

In the above formulations, if any of the waxes of this invention are substituted by the products of Examples 1a through 7a, inferior inks will always be obtained. These formulations show that when the precursor oxidized hydrocarbon wax is modified by a diisocyanate as described in Part 3, a product is formed which is far superior to the precursor oxidized hydrocarbon wax. If, in any of the above formulations, an oxidized hydrocarbon wax is used rather than the products of this invention, an ink is obtained which will yield inks which are softer, more viscous (probably because of insufficient dispersion of the pigment), and tackier. These inks will also exhibit oil bleed and dye bleed and the finished carbon paper will be subject to smudging. It is quite unexpected that these precursor oxidized hydrocarbon materials could be modified by the reaction with small quantities of diisocyanate to yield products which have the desirable characteristics which are required for a wax to be used in carbon paper inks.

These inks may be prepared either in a ball mill or a three-roll mill by conventional procedures using temperatures of from approximately 190° F. to 220° F. Care must be taken when certain dyes are used not to exceed these temperatures; otherwise, the dye will decompose. These finished inks can be coated onto paper using a Mayer type coater or comparable equipment. Normally, it is best to apply approximately 2.5 lbs. of wax per ream for one-time carbons and higher quantities for typewriter carbons.

PART 5

This part deals with additional uses of the reaction products which are produced as described in Part 3.

Because of the very desirable properties, particularly in reference to the improved hardness of the products in this invention, they are useful for blending with other materials to impart their favorable properties, for example: they may be blended in small concentrations with paraffinic type waxes to yield blends with improved hardness and increased melting point. One specific application in this line would be to blend 5–10% of the products described in the examples in Part 3 of this application with paraffin wax to yield a product with better blocking characteristics.

These materials are also useful as corrosion inhibitors, probably because of the fact that they contain high molecular weight carboxylic acids. This is a use which is based on the chemical nature of the product rather than its physical characteristics.

One of the important uses for the products described in Part 3 is for various types of polishes; for instance, floor polish, shoe polish, furniture polish, and automobile polish.

A typical formulation in which these products have found use in the field of emulsion floor polishes is as follows:

| Grams | Material |
| --- | --- |
| 50 | Product of run No. 546 in Table I. |
| 50 | "Durez 219". |
| 10 | Oleic Acid. |
| 5.6 | 2-amino-2-methyl-1-propanol. |
| 4 | Borax. |
| 830 | Water. |

The first three ingredients in the above formulation are blended at temperatures up to but not exceeding 350° F. The mixture is cooled to 210° F. with agitation. The 2-amino-2-methyl-1-propanol is added with stirring at 200 to 210° F. followed immediately by the borax in a saturated solution. The resulting mixture is heated with stirring at 20° F. to a maximum of 210° F. for five minutes and then the wax melt is slowly poured into water at 200° F. with rapid agitation. When the emulsion has smoothed out, 10–20% of a cold solution of leveling agent is added during agitation and cooled to room temperature. A leveling agent which may be used is a 12% ammoniacal shellac solution prepared by dissolving 102 g. of refined dewaxed shellac in a solution of 26 g. of 26° Bé. (28%) ammonia in 722 g. of water.

"Durez 219" is a terpene-phenolic, oil soluble, high melting, low viscosity, thermoplastic resin having a melting point (capillary) of 130–136° C., an acid number of from 60 to 70, a specific gravity at 25° C. of 1.09 and a refractive index of 1.552. It is manufactured and supplied by the Durez Plastic and Chemicals Division of Hooker Electro-Chemical Company.

Many modifications of the above formulation can be made; for instance, the resin can be eliminated or other resins substituted for the above. Other waxes can be used in conjunction with the above or the products of the other examples in this invention can be used.

The above polish formulation, when spread on linoleum, asphalt tile, rubber tile, vinyl tile, etc., yields a film which when dried is very hard, scuff- and abrasion-resistant with a high gloss and with good water resistance, and each of these properties is better than that obtainable using the starting oxidized hydrocarbon wax.

A good no-rub automobile polish and furniture polish can be prepared from the following formulations and procedures:

AUTOMOBILE POLISH

| Material: | Grams |
| --- | --- |
| Product of run No. 520 in Table I | 34 |
| Silicone (5000 cs. visc.) | 20 |
| Mineral spirits (boiling point 275–325° F.) | 1300 |

The wax, silicone, and 20% of the solvent are blended by heating to 190–200° F. When the solution is complete, the remaining solvent (at about 120° F.) is added with agitation. The mixture is cooled with agitation and the agitation continued during packaging to prevent settling.

NO-RUB FURNITURE POLISH

| Material: | Grams |
| --- | --- |
| Product of run No. 437 in Table I | 3.0 |
| Silicone (5000 cs. visc.) | 3.6 |
| Oleic acid | 3.6 |
| Morpholine | 1.7 |
| Mineral spirits (boiling point 275–325° F.) | 67.5 |
| Water | 40.0 |

The wax, silicone and oleic acid are dissolved in the mineral spirits. From this beginning the emulsion may be formed by the wax to water technique as outlined under the emulsion polish procedure. A suitable 5000 cs. viscosity silicone would be Linde L–41 diethyl silicone oil sold by Linde Air Products Co., Division of Union Carbide and Carbon Corporation.

These last two formulas make good high-gloss polishes of the no-rub, quick-drying type. Most silicone polishes require thorough cleaning of the surface of application for best results. With clean surfaces the polish is spread smoothly, allowed to dry to a powdery film and the film wiped off, leaving a high gloss with no rubbing.

The ratio of silicone to wax should be maintained while the variation in the total solids (wax in silicone) is between four and ten percent.

Following is a formulation for the manufacture of a shoe polish wax employing a wax of this invention:

SHOE POLISH

| Material: | Grams |
|---|---|
| Carnauba wax | 5 |
| Paraffin wax (131–133° F.) | 12 |
| Product of run No. 427 in Table I | 8 |
| Turpentine | 15 |
| Mineral spirits | 60 |

The first three ingredients are melted together and to this blend the last two materials are added. After a solution is obtained, the polish is poured at a temperature just above the point in which the wax starts to separate. Depending upon the color of the finished product, any of several dyes may be used, the main criterion being that of solubility.

In any of these formulations, oftentimes other products from this invention other than those specifically mentioned may be used, but generally in these cases, slight modifications may become necessary. These modifications can be made without too much difficulty by those who are skilled in the art. The above formulations are very good starting points and these formulas can be altered or modified in any of many ways.

Attention should be directed to co-pending application, Serial Number 612,945, filed on October 1, 1956.

Having thus described my invention, what I claim as new and desire to secure by Letters Patent, is:

1. The process which comprises reacting (A) an oxidized essentially non-benzenoid hydrocarbon obtained by the conventional oxidation of a non-benzenoid hydrocarbon mixture having a melting point in excess of 50° C. so as to yield a product having an acid number greater than about ten and (B) an organic compound containing as the sole reacting groups a plurality of separate and distinct groups selected from the group consisting of isocyanate and thioisocyanate groups; the ratio of reactants being within the range of 92–98% (A), and 8–2% (B), conducted at temperatures within the range of the melting point of the oxidized hydrocarbon mixture to 150° C. for at least about one hour.

2. The process of claim 1 with the proviso that (B) is a polyisocyanate.

3. The process of claim 2 with the proviso that said reaction be conducted in the presence of at least one mole of water to 10 moles of (B) but less than one mole of water to one mole of (B).

4. The process of claim 3 with the proviso that (B) is a diisocyanate.

5. The process of claim 3 with the proviso that (B) is an aromatic diisocyanate.

6. The process of claim 5 with the proviso that (A) is an oxidized essentially non-benzenoid hydrocarbon obtained by oxidizing a non-benzenoid hydrocarbon mixture having a melting point in excess of 50° C. so as to yield a product having an acid number greater than 10 but less than 60.

7. The process of claim 6 with the further proviso that the oxidized essentially non-benzenoid hydrocarbon mixture has a saponification number greater than 30 but less than 150.

8. The process of claim 7 with the further proviso that the oxidized essentially non-benzenoid hydrocarbon mixture be made from an essentially non-benzenoid hydrocarbon having an average molecular weight less than 1500.

9. The process of claim 5 with the proviso that (A) is an oxidized Fischer-Tropsch wax obtained by the conventional oxidation of Fischer-Tropsch wax having a melting point between 170 and 220° F. so as to yield a product having an acid number between 10 and 40 and a saponification number between 30 and 120.

10. The process of claim 5 with the proviso that (A) is an oxidized tank bottom derived microcrystalline wax having a melting point between 170 and 195° F. so as to yield a product having an acid number between 10 and 40 and a saponification number between 30 and 100.

11. The process of claim 10 with the proviso that (B) is tolylene-2,4-diisocyanate.

12. The process of claim 11 with the proviso that the ratio of reactants being within the range of 97–94% (A) and 3–6% (B).

13. The process of claim 12 with the further proviso that at least part of the water be externally added.

14. The process of claim 5 with the proviso that (A) is an oxidized blend of 2 to 10% polyethylene and 98 to 90% of tank bottom derived microcrystalline wax obtained by the conventional oxidation of the blend so as to yield a product having an acid number between 10 and 40 and a saponification number between 30 and 120.

15. The product obtained by the process described in claim 1.

16. The product obtained by the process described in claim 2.

17. The product obtained by the process described in claim 3.

18. The product obtained by the process described in claim 4.

19. The product obtained by the process described in claim 5.

20. The product obtained by the process described in claim 6.

21. The product obtained by the process described in claim 7.

22. The product obtained by the process described in claim 8.

23. The product obtained by the process described in claim 9.

24. The product obtained by the process described in claim 10.

25. The product obtained by the process described in claim 11.

26. The product obtained by the process described in claim 12.

27. The product obtained by the process described in claim 13.

28. The product obtained by the process described in claim 14.

29. In the manufacture of carbon paper inks the step of intermixing the product defined in claim 15 with a coloring material and a vehicle.

30. In the manufacture of carbon paper inks the step of intermixing the product defined in claim 16 with a coloring material and a vehicle.

31. In the manufacture of carbon paper inks the step of intermixing the product defined in claim 17 with a coloring material and a vehicle.

32. In the manufacture of carbon paper inks the step of intermixing the product defined in claim 18 with a coloring material and a vehicle.

33. In the manufacture of carbon paper inks the step of intermixing the product defined in claim 19 with a coloring material and a vehicle.

34. In the manufacture of carbon paper inks the step of intermixing the product defined in claim 20 with a coloring material and a vehicle.

35. In the manufacture of carbon paper inks the step of intermixing the product defined in claim 21 with a coloring material and a vehicle.

36. In the manufacture of carbon paper inks the step of intermixing the product defined in claim 22 with a coloring material and a vehicle.

37. In the manufacture of carbon paper inks the step of intermixing the product defined in claim 23 with a coloring material and a vehicle.

38. In the manfacture of carbon paper inks the step of intermixing the product defined in claim 24 with a coloring material and a vehicle.

39. In the manufacture of carbon paper inks the step of intermixing the product defined in claim 25 with a coloring material and a vehicle.

40. In the manufacture of carbon paper inks the step of intermixing the product defined in claim 26 with a coloring material and a vehicle.

41. In the manufacture of carbon paper inks the step of intermixing the product defined in claim 27 with a coloring material and a vehicle.

42. In the manufacture of carbon paper inks the step of intermixing the product defined in claim 28 with a coloring material and a vehicle.

43. A carbon paper ink composition containing the product defined in claim 15 with a coloring agent and a vehicle.

44. A carbon paper ink composition containing the product defined in claim 16 with a coloring agent and a vehicle.

45. A carbon paper ink composition containing the product defined in claim 17 with a coloring agent and a vehicle.

46. A carbon paper ink composition containing the product defined in claim 18 with a coloring agent and a vehicle.

47. A carbon paper ink composition containing the product defined in claim 19 with a coloring agent and a vehicle.

48. A carbon paper ink composition containing the product defined in claim 20 with a coloring agent and a vehicle.

49. A carbon paper ink composition containing the product defined in claim 21 with a coloring agent and a vehicle.

50. A carbon paper ink composition containing the product defined in claim 22 with a coloring agent and a vehicle.

51. A carbon paper ink composition containing the product defined in claim 23 with a coloring agent and a vehicle.

52. A carbon paper ink composition containing the product defined in claim 24 with a coloring agent and a vehicle.

53. A carbon paper ink composition containing the product defined in claim 25 with a coloring agent and a vehicle.

54. A carbon paper ink composition containing the product defined in claim 26 with a coloring agent and a vehicle.

55. A carbon paper ink composition containing the product defined in claim 27 with a coloring agent and a vehicle.

56. A carbon paper ink composition containing the product defined in claim 28 with a coloring agent and a vehicle.

References Cited in the file of this patent

UNITED STATES PATENTS

| | | |
|---|---|---|
| 2,123,186 | Epstein et al. | July 12, 1928 |
| 2,319,057 | Hanford | May 11, 1943 |
| 2,326,501 | Siefken et al. | Aug. 10, 1943 |
| 2,358,475 | Pratt et al. | Sept. 19, 1944 |
| 2,426,248 | Sugarman | Aug. 26, 1947 |
| 2,430,479 | Pratt et al. | Nov. 11, 1947 |
| 2,680,759 | Otto | June 8, 1954 |

FOREIGN PATENTS

| | | |
|---|---|---|
| 885,875 | France | Sept. 28, 1943 |
| 1,092,695 | France | Apr. 26, 1955 |